United States Patent
Bilinski et al.

(10) Patent No.: US 9,477,663 B2
(45) Date of Patent: Oct. 25, 2016

(54) UNDOING AN ACTION IN A MEDIA PLAYER

(71) Applicant: Google Inc., Mountain View, CA (US)

(72) Inventors: Brandon Bilinski, San Francisco, CA (US); Curtis Glen Hawthorne, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/043,942

(22) Filed: Oct. 2, 2013

(65) Prior Publication Data

US 2015/0074059 A1    Mar. 12, 2015

Related U.S. Application Data

(63) Continuation of application No. 14/019,569, filed on Sep. 6, 2013, now abandoned.

(51) Int. Cl.
| | |
|---|---|
| *G06F 7/00* | (2006.01) |
| *G06F 17/00* | (2006.01) |
| *G06F 17/30* | (2006.01) |
| *G06F 3/0484* | (2013.01) |
| *H04M 1/725* | (2006.01) |
| *G11B 27/36* | (2006.01) |
| *G06F 15/16* | (2006.01) |

(52) U.S. Cl.
CPC ....... *G06F 17/30017* (2013.01); *G06F 3/0484* (2013.01); *G06F 17/30038* (2013.01); *G06F 17/30088* (2013.01); *G11B 27/36* (2013.01); *H04M 1/72558* (2013.01)

(58) Field of Classification Search
CPC ........... G06F 3/0484; G06F 17/30088; G06F 17/30038

USPC ................................. 715/716; 707/649, 913
See application file for complete search history.

(56) References Cited

U.S. PATENT DOCUMENTS

| | | | |
|---|---|---|---|
| 6,972,363 B2 * | 12/2005 | Georges et al. .............. 715/727 |
| 7,536,565 B2 | 5/2009 | Girish et al. |
| 7,593,782 B2 * | 9/2009 | Jobs et al. ...................... 700/94 |
| 8,443,007 B1 | 5/2013 | Kindig et al. |
| 2005/0015712 A1 * | 1/2005 | Plastina et al. ............ 715/500.1 |
| 2005/0149872 A1 * | 7/2005 | Fong et al. .................... 715/727 |
| 2009/0172542 A1 * | 7/2009 | Girish et al. .................. 715/716 |
| 2010/0095332 A1 * | 4/2010 | Gran et al. ....................... 725/93 |
| 2010/0235741 A1 * | 9/2010 | Newman et al. ............. 715/716 |
| 2010/0268359 A1 | 10/2010 | Prestenback et al. |
| 2013/0035778 A1 * | 2/2013 | Jobs et al. ...................... 700/94 |
| 2013/0173034 A1 | 7/2013 | Reimann et al. |

* cited by examiner

Primary Examiner — Usmaan Saeed
Assistant Examiner — Brian E. Weinrich
(74) Attorney, Agent, or Firm — Morris & Kamlay LLP

(57) ABSTRACT

A method for automatically undoing an action in a music player application is provided. A method includes storing a first state in a media application. The first state may include at least one of: a list of one or more media items listed in a first order, and a first time position in a first media item of the one or more media items. An action changing the first state to a second state may be received. Next, a request to undo the action changing the first state to the second state may be received, and the first state may be restored based on the stored first state. The method may also include presenting a list of one or more prior actions and each prior action may change the media application to a corresponding state different from a preceding state.

24 Claims, 4 Drawing Sheets

UNDOING AN ACTION IN A MEDIA PLAYER

CROSS-REFERENCE TO RELATED APPLICATIONS

This application is a continuation of U.S. application Ser. No. 14/019,569, filed Sep. 6, 2013, the disclosure of which is incorporated by reference in its entirety.

BACKGROUND

While using a media application, especially one on a mobile device, it can be easy for a user to accidentally select a button and disrupt his current media experience. For example, a user may be listening to a song A and in the middle of playback he may accidentally select the "next track" button, resulting in playback of the next song B in the playlist. If the user wishes to go back to the previous song A, the user would have to select the "previous track" button, but playback would begin from the beginning of song A rather than the point in song A when the "next track" button was accidentally selected. As another example, if a user double-taps a single song in a touch-sensitive music player interface, such as on a mobile phone, the music player may abandon a current playlist and play the single song instead, which may cause the playlist to be lost. The inability to undo an action taken in a media application may result in additional user effort to manually undo an action taken accidentally and a poor user experience.

BRIEF SUMMARY

According to an implementation of the disclosed subject matter, a method includes storing a first state in a media application, wherein the first state includes at least one of: a list of one or more media items listed in a first order, and a first time position in a first media item out of the one or more media items. Next, an action may be received changing the first state to a second state. A request to undo the action changing the first state to the second state may be received and, as a result, the first state may be restored based on the stored first state.

An implementation of the disclosed subject matter provides a system including a processor configured to store a first state in a media application. The first state may include at least one of: a list of one or more media items listed in a first order, and a first time position in a first media item of the one or more media items. An action changing the first state to a second state may be received. Next, a request to undo the action changing the first state to the second state may be received and the first state may be restored based on the stored first state.

Implementations of the disclosed subject matter may provide improved functionality when using a media application. The disclosed subject matter provides methods for automatically undoing one or more actions in a media application and restoring the media application to the position in a previously playing song and/or restoring a prior state in the application. This may result in improved media application operability and increased user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The present disclosure provides a method for undoing one or more actions in a media application. According to the present disclosure, if a user makes a mistake in selecting a button in the media application, he is able to revert back to exactly where he was in a media item and/or a prior state in the media application. Taking a music application as an example, the present disclosure allows a user to go back to a listening position in a song at which he was upon taking an action and/or the go back to the previous style of playback (e.g., shuffle), playlist order, and the like. Specifically, whenever a user takes an action that affects the current state of the music player, the current state of the music application may be stored. For example, storing the current state may include the current settings, the queue of tracks, the order of tracks in the queue, the position in a currently playing song, or the like. If the user chooses to undo the action, the application reverts to the state that was stored.

In general, if the user chooses to undo one or more actions, the media application may be restored to a prior state that was stored. For example, a user may take an action, such as adding a song D to the queue of songs, while in the middle of playback of a song C. The user may wish to undo the addition of song D to the queue. Rather than delete/remove song D from the queue, the user may select the undo button and the prior state may be restored. In this case, the system may restore the queue as it was prior to the addition of song D, that is, without song D. Additionally, restoring the queue prior to the last action taken may not interrupt playback of song C.

As another example, a user may have a playlist of 4 songs in a particular order, such as song A, song B, song C, and song D. The user may take action such as selecting the shuffle playback feature. As a result, the playlist may be rearranged in a new order, such as, song C, song A, song B, and song D. The user may select the undo button, and as a result, the last action shuffling the playlist may be undone and accordingly, the playlist may restored to the prior order of song A, song B, song C, and song D.

Figure 1:
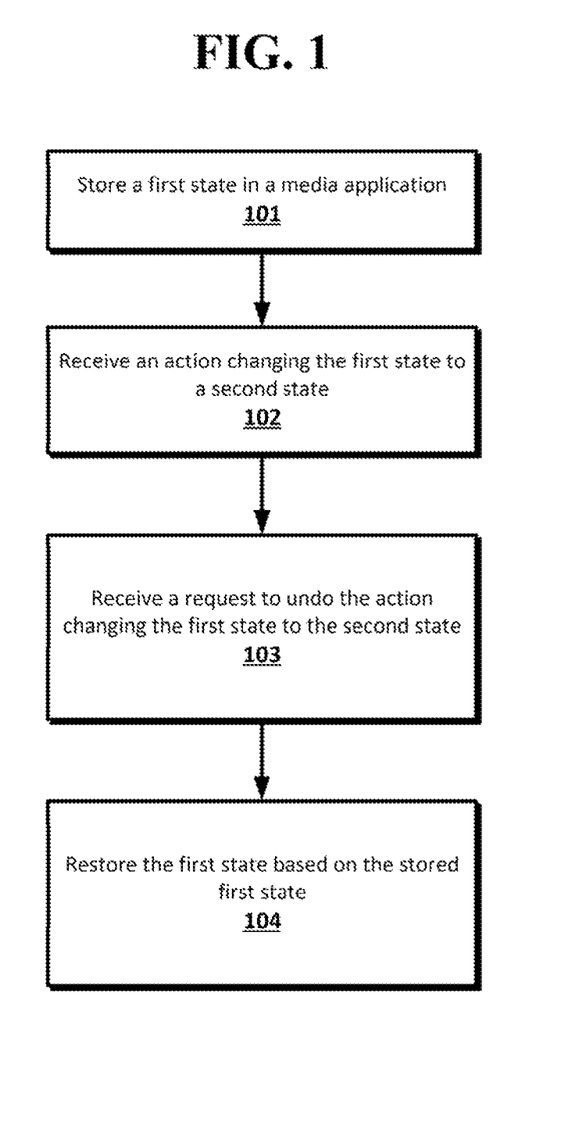
FIG. 1 shows an example process according to an implementation of the disclosed subject matter.

Additionally, the last several states may be stored so that a user may revert back several actions to any state prior to the last. For example, a user may wish to undo the last 4 actions and revert back to the state in which the music player was 4 actions ago. In general, the present disclosure proposes a method for undoing one or more actions in a media player. FIG. 1 shows an example process according to an implementation of the disclosed subject matter. The method includes storing a first state in a media application, at 101. The first state may include a list of one or more media items listed in a first order and/or a first time position in a first of the one or more media items. At 102, one or more actions may be received changing the first state to a second state. Next, a request to undo the action or actions changing the first state to the second state may be received, at 103. As a result, the first state may be restored based on the stored first state, at 104.

A media item may be any item capable of being activated by a media application. In particular, a media application may activate a media item such as by playing, displaying, or presenting the media item. A media item may be, for example, a song, an album, a video, a movie, a show, a slideshow, and the like. A time position in a media item may refer to a point in time during activation of a media item. For example, a time position may be presented in a variety of formats such as elapsed time, time remaining, a slide number within a slideshow, and the like.

As discussed herein, one or more actions changing a first state to a second state may be any action in a media application that changes the current state. A state may include a list of attributes in a media application such as a currently playing media item, a time position in a currently playing media item, a playlist of one or more media items, the order of a plurality of media items in a playlist, a playback setting in a playlist (e.g., shuffle or the like), the position of a particular media item in a list of media items, and the like. A state may be stored in a variety of ways, such as storing a list of attributes and an associated value for a specific state, storing a list of attributes associated with a specific state and assigning a state identifier to the specific state, and the like. Examples of actions that change the current state in a media application include shuffling a list of media items, adding a media item to a list of media items, removing a media item from a list of media items, changing the first order of the one or more media items in a list of media items, playing a second media item, and/or changing the time position in a media item. In some instances, an action may occur when a media item is playing. For example, a user may have a playlist including the songs Scream, Diamonds, Love Song, Umbrella, Lights, Holy Grail, Princess of China, Starships, and Suit & Tie. While the song Diamonds is playing, the user may take the following actions: shuffle the playlist, delete the song Umbrella from the playlist, add the songs Stay and Kamo, and move the song Holy Grail to the end of the playlist.

According to an implementation, a system may include a processor configured to store a first state in a media application. The first state may include a list of one or more media items listed in a first order, and/or a first time position in a first of the one or more media items. One or more actions may be received changing the first state to a second state. Next, a request may be received to undo the action or actions changing the first state to the second state, and the first state may be restored based on the stored first state.

As discussed herein, a second state may include at least one of: the list of one or more media items listed in a second order, a second time position in the first media item, and a third time position in a second media item, and/or an updated or different list of media items. For example, a first state may include a playlist including the songs in the following order: song #1—Scream, song #2—Diamonds, song #3—Love Song, song #4—Umbrella, and song #5—Lights. Additionally, the first state may include the time position in a currently playing song, such as 03:15 in the song Diamonds. At the time position 03:15 in Diamonds, a user may change the first state to a second state by adding a song #6—Holy Grail to the playlist. In this case, the second state may include the playlist including the songs in the following order: song #1—Scream, song #2—Diamonds, song #3—Love Song, song #4—Umbrella, song #5—Lights, and song #6—Holy Grail. Next, a user may request to undo this action changing the first state to the second state, and the playlist may be restored to the songs in the following order: song #1—Scream, song #2—Diamonds, song #3—Love Song, song #4—Umbrella, and song #5—Lights. Additionally, playback of the song Diamonds may be restored to the time position of 03:15.

As another example, a first state may include a playlist including song #1—Princess of China, song #2—Starships, song #3—Suit & Tie. While the song Starships is playing at the time position of 02:33 in Starships, the user may delete the song Starships from the playlist and the song Suit & Tie may begin playing. The user may undo the action deleting Starships from the playlist. As a result, Starships may be restored as song #2 in the playlist and playback of Starships may be initiated at 02:33 in the song.

In some instances, when a request to undo one or more actions would change the currently playing media item, a notification may be provided to a user to confirm that he wishes to change the currently playing media item. As in the example above, while the song Suit & Tie is playing, the user may undo the prior action deleting Starships from the playlist, which was taken at the 02:33 position during playback of Starships. As a result, Starships may be restored to the playlist as song #2. Additionally, since the prior action of deleting Starships was taken at the 02:33 time position in Starships, the user may receive a notification asking the user if he wishes to continue playback of the currently playing song Suit & Tie or return to the 02:33 time position in Starships. Additional features related to undoing an action that would change the currently playing media item are described in further detail below.

Figure 2:
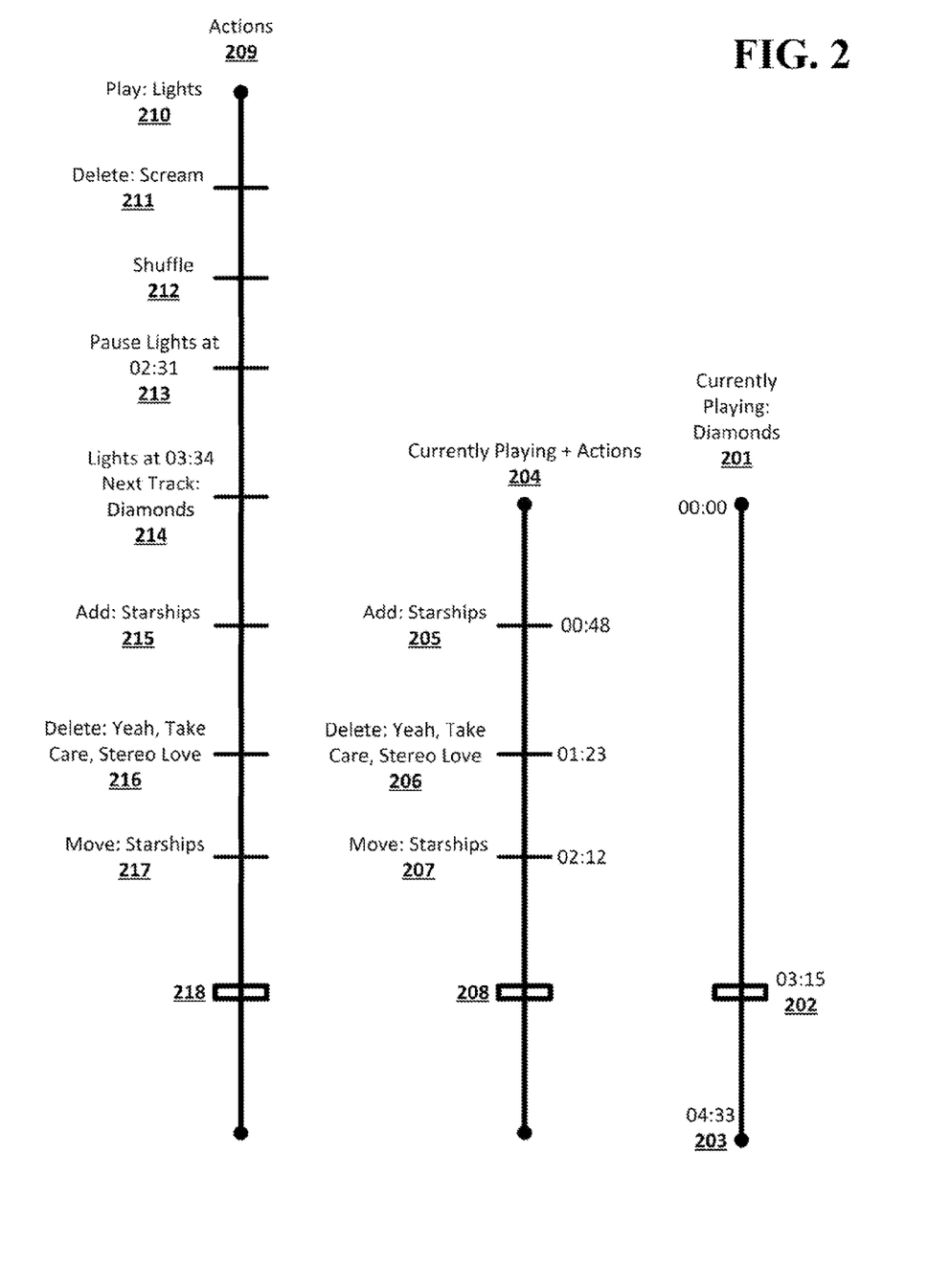
FIG. 2 shows an example configuration according to an embodiment of the disclosed subject matter.

FIG. 2 shows an example configuration according to an embodiment of the disclosed subject matter. As shown in FIG. 2, a media application may provide a user with the ability to undo one or more actions in the media application. Multiple control options may be presented to a user for undoing one or more actions and/or controlling a currently playing media item. For example, currently playing slider control 201 and control bar 202 may be provided for controlling the time position in a currently playing media item. Action slider control 209 and control bar 218 may be provided for undoing prior actions taken in the media application. Currently Playing+Actions slider control 204 and control bar 208 may be provided for undoing prior actions in conjunction the time position in the currently playing media item. Various other implementations and/or interfaces may be provided for undoing actions taken in a media application. For example, one or more prior actions may be presented to a user in a list, and when selected by a user, each prior action may change the media application to a corresponding state different from a preceding or current state, for example by reverting to a state in which the media player existed before the selected action was performed.

As shown in FIG. 2, a user may be listening to a currently playing media item, the song Diamonds, at 201. The currently playing slider control 201 may show the total length in time of the song Diamonds 04:33 at 203 and the current time position in the song 03:15 at 202. The currently playing+actions slider control 204 may show the prior actions taken during playback of the currently playing song Diamonds. As shown, during playback of the song Diamonds, the user may have previously moved the song Starships, deleted the songs Yeah, Take Care, and Stereo Love, and added the song Starships to the playlist. To undo the actions taken while the song Diamonds has been playing, the user may have several options. For example, if the user wishes to undo the actions taken while listening to Diamonds, the user may move the control bar 218 on the action slider control 209 back to 217 to undo moving Starships within the playlist, 216 to undo deleting the songs Yeah, Take Care, and Stereo Love, or 215 to undo adding Starships to the playlist. Undoing actions using the action slider control 209 may undo prior actions 217, 216, and 215 without interrupting playback of the currently playing track Diamonds. If the user wishes to undo the actions taken while listening to Diamonds and also adjust playback of Diamonds to the time positions at which each action was taken, the user may move the control bar 208 on the action slider control 204. The user may move the control bar 208 back to 207 to undo moving Starships within the playlist and initiate playback of Diamonds at 02:12, 206 to undo deleting the songs Yeah, Take Care, and Stereo Love and initiate playback of Diamonds at 01:23, and 205 to undo adding Starships to the playlist and initiate playback of Diamonds at 00:48. Undoing actions using the currently playing+actions slider control 204 may undo prior actions 207, 206, and 205 while also adjusting playback of the currently playing track Diamonds to the time positions as which each action was taken.

In an implementation, an action changing the list of media items may be taken while a media item is playing. In this case, a first state may include a list of one or more media items in a first order. An action may be taken changing the order and/or number of media items in the list. For example, while the media item is playing, one or more actions may be taken such as shuffling the list of media items, adding a media item to the list of media items, deleting a media item from the list of media items, and/or changing the particular order of the one or more media items in the list of media items. In this case, restoring the first state may include restoring the first order of the list of media items in the first state while the first media item continues to play.

Undoing some actions may change a currently playing media item, for example, an action may change the time position in a currently playing media item or cause a media item to be played that is different than the currently playing media item. In this case, a change to a currently playing media item may occur automatically or a notification may be provided to a user to confirm that he wishes to change playback of the currently playing media item. For example, if a user moves control bar 218 back to action 214 initiating playback of Diamonds from the beginning of the song, the song may automatically restart from the beginning or the user may receive a notification asking if he wishes to either revert back to time position 00:00 in the song or continue playing the song. Similarly, the user may move the control bar 218 back to 213 to undo pausing the song Lights at 02:31, 212 to undo shuffling the playlist, 211 to undo deleting the song Scream, or 210 to revert back to initiating playback of the song Lights from the beginning. If the user wishes to undo any of these prior actions 213, 212, 211, or 210 while listening to the song Diamonds, the user may be asked if he wishes to revert back to the time position in the song Lights that was playing at the time each action was taken or continue listening to Diamonds.

As another example, during playback of a first media item, a user may skip to the next media item in the list. As shown on action slider control 209, at 214, during playback of the song Lights at the time position 03:34, the user may have advanced to the next track Diamonds. Undoing this action may be performed in a variety of ways. For example, during playback of Diamonds, the user may move the control bar 218 back to 214 to undo skipping to the next track Diamonds. As a result, playback of Lights at the 03:34 position in the song may be initiated automatically. In an implementation, during playback of Diamonds, the user may move the control bar 218 back to 214 to undo skipping to the next track Diamonds. As a result, the user may be asked whether he wishes to initiate playback of Lights at the 03:34 position, revert back to initiating playback of Diamonds from the beginning, or continue listening to Diamonds at the current time position. Additionally, upon moving the control bar 218 back to 214, actions 215, 216 and 217 may be undone automatically, or the user may be asked if he wishes to undo one or all of these prior actions. Alternatively, the user may move the control bar 218 back to a position between 213 and 214 on the action slider control 209 to initiate playback of Lights at a time position before 03:34 at action 214 but without reverting back to the action of pausing Lights at 02:31, at 213.

A user may also be able to undo prior actions taken that affected playback of a currently playing media item. For example, a user may be watching a movie at a first time position of 23:45 and he may skip to another chapter or fast forward to a second time position of 1:02:23. By selecting to undo this action, the first time position may be restored and playback of the movie may be initiated at 23:45.

In some configurations, a default action may be performed instead of asking the user whether to perform a specific action. For example, a media player may default to always continue playing the current song, even if the user chooses to undo an action that added the song to the playlist. As another example, the media player may default to always restoring a complete state selected by the user, including the currently-playing media item and/or the current position within a media item. A media player as disclosed herein also may provide a mechanism for the user to select or modify such default behavior.

In an implementation, there may be several ways to undo actions taken in a list of media items. Specifically, a first state may include a list of one or more media items in a first order and X number of media items, and a second state may include the list of the one or more media items in a second order and Y number of media items. For example, a playlist may include 8 songs in the following order:

| 1 | Super Bass |
| 2 | Princess of China |
| 3 | Paradise |
| 4 | Man Down |
| 5 | Beautiful People |
| 6 | Fly |
| 7 | Dance |
| 8 | The Time |

In a first state, this playlist has a first order shown above and X=8 songs. If the user deletes the song Paradise from the playlist, the second state of the playlist would have a second order such that songs #4-#8 would move up in the list and Y=7 songs. The user may request to undo deleting Paradise from the playlist, and as a result, the playlist may be automatically restored to the first order and Paradise may be restored to the playlist as song #3. Alternatively, Paradise may be restored to the end of the playlist as song #8. Similarly, the user may add a song Umbrella to the playlist in between Fly and Dance, making Umbrella song #7, Dance song #8, and The Time song #9. If the user undoes this addition, Umbrella may be automatically deleted from the list and the first order may be restored. Alternatively, the user may be asked if he wishes to undo the addition of Umbrella as song #7 but keep Umbrella in the playlist, in which case, Umbrella may remain in the list but may be moved to the end of the list as song #9.

Additionally, a first state may include a list of one or more media items in a first order and a second state may include the list of the one or more media items in a second order. For example, the playlist of 8 songs shown above are in a first order. The playlist may be shuffled resulting in a second order of the 8 songs, the second order being different from the first order. The user may request to undo shuffling the playlist and, as a result, the playlist may be restored to the first order of the songs.

Figure 3:
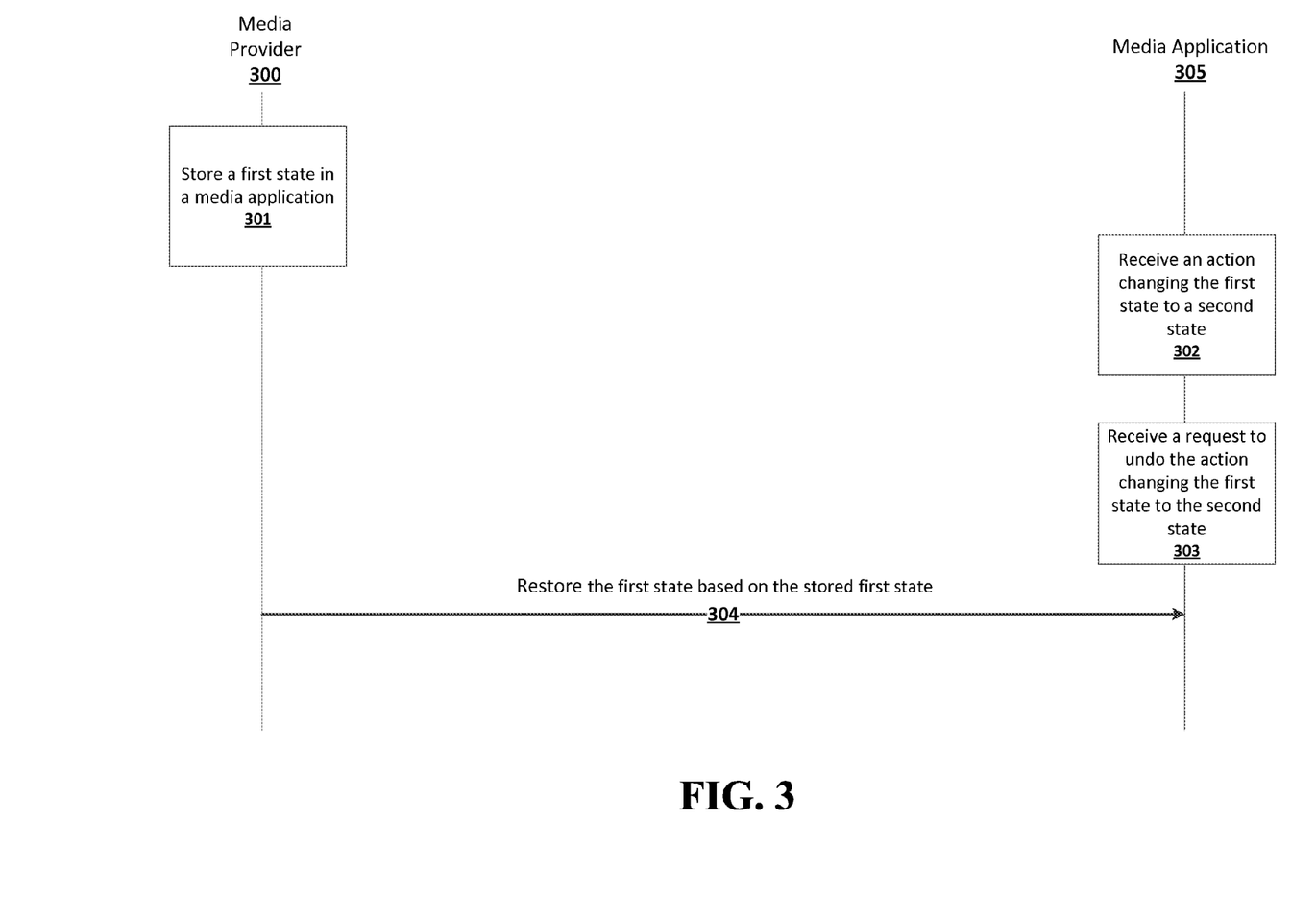
FIG. 3 shows an example information flow according to an implementation of the disclosed subject matter.

FIG. 3 shows an example information flow according to an implementation of the disclosed subject matter. As shown, a media provider 300 may store a first state in a media application 305, at 301. For example, the media application 305 may provide the first state to a media provider 300 to be stored by the media provider 300. Alternatively or in addition, the media application 305 may also store the first state. The media application 305 may receive an action changing the first state to a second state, at 302. Next, at 303, the media application 305 may receive a request to undo the action changing the first state to the second state. As a result, the media provider 300 may restore the first state based on the stored first state, at 304. In an instance, the media provider 300 may provide the stored first state to the media application 305, and the media application 305 may restore the first state. In some instances, a media provider 300 and a media application 305 may be the same or different entities. For example, a media provider service may include a media application that it provides to users, or a media provider service may store and/or provide media items to a media application service. Alternatively or in addition, one or more components and/or features of the disclosed subject matter such as a media provider, a media application, storing a state and/or action taken in a media application, providing media items, and the like may be implemented in a cloud-based system.

In an implementation, the communication between a media application and a media provider may be across one or more bridges between the interfaces. For example, the communications between the media application and the media provider may be managed or assisted by a third device, such as, a coordinating device, a local coordinator, a remote server, etc. In such cases, the third device may, for example, receive a request to undo an action changing a first state to a second state and provide the request to a media provider. Alternatively, the third device may request a stored first state from a media provider and may receive the stored first state from the media provider. The third device may then provide instructions to the media application to restore the first state based on the stored first state. In an embodiment, the third device may also act as a bridge between a media provider and the content activation device when providing a second version of the content to the content activation device. Furthermore, more than one intermediate device may be implemented to facilitate communication between a media application, a user, and a media provider.

Figure 4:
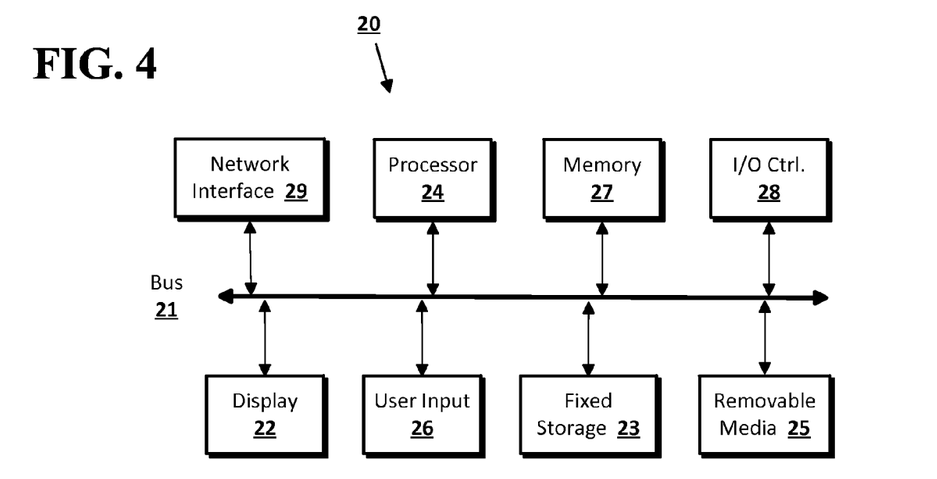
FIG. 4 shows a computer according to an embodiment of the disclosed subject matter.

Embodiments of the presently disclosed subject matter may be implemented in and used with a variety of component and network architectures. FIG. 4 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
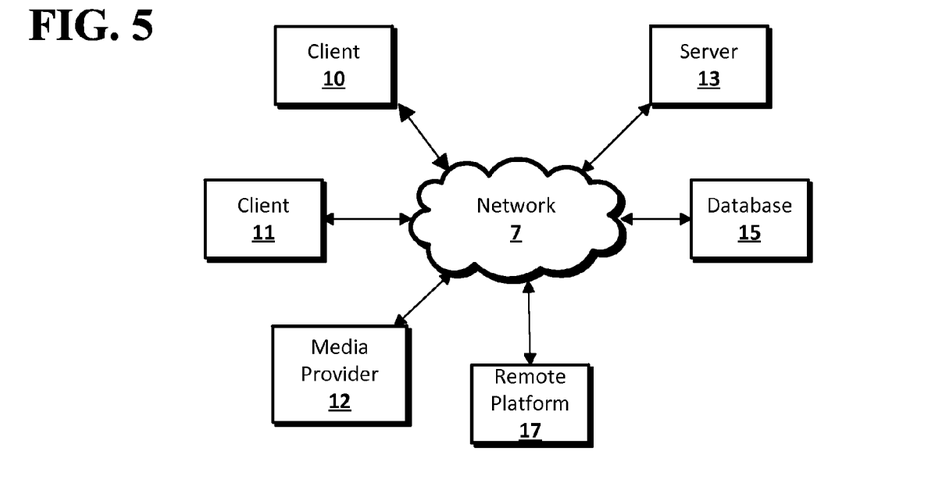
FIG. 5 shows a network configuration according to an embodiment of the disclosed subject matter.

FIG. 5 shows an example network arrangement according to an embodiment of the disclosed subject matter. One or more clients 10, 11, such as local computers, smart phones, tablet computing devices, media provider 12, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13, media provider 12, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, media provider 12, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   storing two or more states of one or more media items in a media application, wherein a list of the one or more media items includes a first media item and the two or more states include the list of one or more media items listed in a first order and a first time position in the first media item;
   receiving a first action changing a first state of the two or more states to a second state;
   presenting, to a user, a list of one or more prior actions comprising the first action, each prior action changing the media application to a corresponding state different from a preceding state;
   receiving a request to undo the first action, wherein the request to undo the first action is based on a selection of the first action from among the list of one or more prior actions; and
   restoring the first state based on the stored first state, the restoring including one or both of initiating playback of the first media item at the first time position and restoring the list of media items to the first order,
   wherein the first state includes the first time position in the first media item and the first action occurs at the first time position in the first media item, and
   wherein the first action occurs when the first media item is playing, and the first state includes the list of one or more media items in the first order, and the first action is selected from a group, the group including: shuffling the list of media items, adding a media item to the list of media items, deleting a media item from the list of media items, and changing the particular order of the one or more media items in the list of media items.

2. The method of claim 1, wherein the first action changing the first state to a second state is selected from the group consisting of: shuffling the list of media items, adding a media item to the list of media items, removing a media item from the list of media items, changing the first order of the one or more media items in the list of media items, playing a second media item, a changing the first time position in the first media item.

3. The method of claim 1, wherein the second state includes at least one selected from the group consisting of:
   the list of one or more media items listed in a second order;
   a second time position in the first media item, and
   a third time position in a second media item.

4. The method of claim 1, wherein the first state includes the first time position in the first media item and the list of media items in the first order and the first action is removing the first media item from the list of media items, wherein restoring the first state comprises initiating playback of the first media item at the first time position and restoring the first media item to the list of media items.

5. The method of claim 4, wherein restoring the first media item to the list of media items includes restoring the first order of the list of media items in the first state.

6. The method of claim 1, wherein the first state includes the list of one or more media items in the first order and the second state includes the list of the one or more media items in a second order.

7. The method of claim 1, wherein the first state includes the list of one or more media items in the first order and a first number of media items and the second state includes the list of the one or more media items in a second order and a second number of media items.

8. The method of claim 1, wherein the first state includes the first time position in the first media item and the first action is playing a second media item, wherein restoring the first state comprises initiating playback of the first media item at the first time position.

9. The method of claim 1, wherein the one or more media items are selected from the group consisting of: a song, an album, a video, a movie, a show, and a slideshow.

10. The method of claim 1, wherein the first time position in the first media item is a point in time during playback of the first media item.

11. The method of claim 1, wherein the media application is operational to play the one or more media items.

12. A system comprising:
a processor configured to:
store two or more states of one or more media items in a media application, wherein a list of the one or more media items includes a first media item and the two or more states include the list of the one or more media items listed in a first order and a first time position in the first media item of the one or more media items;
receive a first action changing a first state of the two or more states to a second state;
present, to a user, a list of one or more prior actions comprising the first action, each prior action changing the media application to a corresponding state different from a preceding state;
receive a request to undo the action changing the first state to the second state, wherein the request to undo the first action is based on a selection of the first action from among the list of one or more prior actions; and
restore the first state based on the stored first state, the restoring including one or both of initiating playback of the first media item at the first time position and restoring the list of media items to the first order,
wherein the first state includes the first time position in the first media item and the first action occurs at the first time position in the first media item, and
wherein the first action occurs when the first media item is playing, and the first state includes the list of one or more media items in the first order, and the first action is selected from a group, the group including: shuffling the list of media items, adding a media item to the list of media items, deleting a media item from the list of media items, and changing the particular order of the one or more media items in the list of media items.

13. The system of claim 12, wherein the first action changing the first state to a second state is selected from the group consisting of: shuffling the list of media items, adding a media item to the list of media items, removing a media item from the list of media items, changing the first order of the one or more media items in the list of media items, playing a second media item, a changing the first time position in the first media item.

14. The system of claim 12, wherein the second state includes at least one selected from the group consisting of:
the list of one or more media items listed in a second order;
a second time position in the first media item, and
a third time position in a second media item.

15. The system of claim 12, wherein the first state includes the first time position in the first media item and the list of media items in the first order and the first action is removing the first media item from the list of media items, wherein restoring the first state comprises initiating playback of the first media item at the first time position and restoring the first media item to the list of media items.

16. The system of claim 15, wherein restoring the first media item to the list of media items includes restoring the first order of the list of media items in the first state.

17. The system of claim 12, wherein the first state includes the list of one or more media items in the first order and the second state includes the list of the one or more media items in a second order.

18. The system of claim 12, wherein the first state includes the list of one or more media items in the first order and a first number of media items and the second state includes the list of the one or more media items in a second order and a second number of media items.

19. The system of claim 12, wherein the first state includes the first time position in the first media item and the first action is playing a second media item, wherein restoring the first state comprises initiating playback of the first media item at the first time position.

20. The system of claim 12, wherein the first state includes the first time position in the first media item and the first action is changing the first time position to a second time position in the first media item, and wherein restoring the first state comprises initiating playback of the first media item at the first time position.

21. The system of claim 12, wherein the first action occurs when the first media item is playing, the first state includes the list of one or more media items in the first order, and the first action is selected from the group consisting of: shuffling the list of media items, adding a media item to the list of media items, deleting a media item from the list of media items, and changing the particular order of the one or more media items in the list of media items, and wherein restoring the first state comprises restoring the first order of the list of media items in the first state while the first media item is being played.

22. The system of claim 12, wherein the one or more media items are selected from the group consisting of: a song, an album, a video, a movie, a show, and a slideshow.

23. The system of claim 12, wherein the first time position in the first media item is a point in time during playback of the first media item.

24. The method of claim 1, wherein restoring the first state based on the stored first state comprises initiating playback of the first media item at the first time position and restoring the list of media items to the first order.

* * * * *